(12) United States Patent
Islam et al.

(10) Patent No.: US 11,558,896 B2
(45) Date of Patent: Jan. 17, 2023

(54) METHODS AND APPARATUSES FOR GENERATING QUASI CO-LOCATED CONFIGURATIONS

(71) Applicant: QUALCOMM Incorporated, San Diego, CA (US)

(72) Inventors: Muhammad Nazmul Islam, Littleton, MA (US); Tao Luo, San Diego, CA (US); Yan Zhou, San Diego, CA (US); Makesh Pravin John Wilson, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/566,508

(22) Filed: Sep. 10, 2019

(65) Prior Publication Data

US 2020/0112984 A1    Apr. 9, 2020

Related U.S. Application Data

(60) Provisional application No. 62/741,949, filed on Oct. 5, 2018.

(51) Int. Cl.
*H04W 74/00*    (2009.01)
*H04W 74/08*    (2009.01)

(52) U.S. Cl.
CPC ..... *H04W 74/006* (2013.01); *H04W 74/0833* (2013.01)

(58) Field of Classification Search
CPC ............ H04W 74/006; H04W 74/0833; H04L 5/001; H04L 5/0023; H04L 5/0048; H04L 5/0051; H04L 5/0091
See application file for complete search history.

(56) References Cited

U.S. PATENT DOCUMENTS

| | | | |
|---|---|---|---|
| 2018/0332520 A1* | 11/2018 | Cheng | H04B 7/0617 |
| 2019/0082471 A1* | 3/2019 | Tsai | H04L 5/0048 |
| 2019/0313437 A1* | 10/2019 | Jung | H04L 5/0042 |
| 2019/0313445 A1* | 10/2019 | Tsai | H04W 74/004 |
| 2020/0100193 A1* | 3/2020 | Cheng | H04W 72/1268 |
| 2020/0127876 A1* | 4/2020 | Shi | H04W 72/1273 |
| 2020/0304256 A1* | 9/2020 | Park | H04L 5/0048 |

FOREIGN PATENT DOCUMENTS

WO    2019052472 A1    3/2019

OTHER PUBLICATIONS

International Search Report and Written Opinion—PCT/US2019/050649—ISA/EPO—dated Nov. 21, 2019.

(Continued)

*Primary Examiner* — Derrick V Rose
(74) *Attorney, Agent, or Firm* — ArentFox Schiff LLP

(57) ABSTRACT

Aspects of the present disclosure include methods, apparatuses, and computer readable media for receiving a PDCCH order for a MSG 1 transmission having a first DMRS that is quasi co-located with a first reference signal, and receiving a corresponding RACH message having a second DMRS that is quasi co-located with a second reference signal, wherein the first reference signal and second reference signal are different.

29 Claims, 9 Drawing Sheets

(56) References Cited

OTHER PUBLICATIONS

Samsung: "Remaining Details on PRACH Procedure", 3GPP TSG RAN WG1 Meeting 91, 3GPP Draft; R1-1720278, 3rd Generation Partnership Project (3GPP), Mobile Competence Centre, 650, Route Des Lucioles, F-06921 Sophia-Anti Polis Cedex, France, vol. RAN WG1, No. Reno, USA; Nov. 27, 2017-Dec. 1, 2017, Nov. 18, 2017 (Nov. 18, 2017), 18 Pages, XP051369905, Retrieved from the Internet: URL: http://www.3gpp.org/ftp/tsg%5Fran/WG1%5FRL1/TSGR1%5F91/Docs/ [retrieved on Nov. 18, 2017].
Vivo: "Remaining Issues on RACH Procedure", 3GPP TSG RAN WG1 Meeting #93, 3GPP Draft; R1-1806035_Remaining Issues on RACH Procedure, 3rd Generation Partnership Project (3GPP), Mobile Competence Centre, 650, Route Des Lucioles ; F-06921 Sophia-Antipolis Cedex, France, vol. RAN WG1, No. Busan, Korea; May 21, 2018-May 25, 2018, May 20, 2018 (May 20, 2018), 10 Pages, XP051441250, Retrieved from the Internet: URL: http://www.3gpp.org/ftp/Meetings%5F3GPP%5FSYNC/RAN1/Docs/ [retrieved on May 20, 2018], Section 2.4. QCL.
ZTE: "Remaining Details of RACH Procedure", 3GPP TSG RAN WG1 Meeting #93, 3GPP Draft; R1-1805945 Remaining Details of RACH Procedure, 3rd Generation Partnership Project (3GPP), Mobile Competence Centre, 650, Route Des Lucioles ; F-06921 Sophia-Antipolis Cedex, France, vol. RAN WG1, No. Busan, Korea; May 21, 2018-May 25, 2018, May 20, 2018 (May 20, 2018), 15 Pages, XP051441164, Retrieved from the Internet: URL: http://www.3gpp.org/ftp/Meetings%5F3GPP%5FSYNC/RAN1/Docs/ [retrieved on May 20, 2018].

* cited by examiner

400

METHODS AND APPARATUSES FOR GENERATING QUASI CO-LOCATED CONFIGURATIONS

CROSS REFERENCE TO RELATED APPLICATIONS

The current application claims priority to U.S. Provisional Patent Application No. 62/741,949, entitled "METHODS AND APPARATUSES FOR GENERATING QUASI CO-LOCATED CONFIGURATIONS," filed on Oct. 5, 2018, the contents of which are incorporated by reference in their entirety.

BACKGROUND

Aspects of the present disclosure relate generally to wireless communication networks, and more particularly, to apparatus and methods for generating quasi co-location (QCL) configurations.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In wireless communication, a Random Access Channel (RACH) or Physical Random Access Channel (PRACH) procedure may allow a user equipment (UE) in a cell to begin the synchronization process with a base station (BS) covering the cell. During a step in the PRACH/RACH procedure, however, the UE or the BS may utilize a certain beam configuration. Incidentally, the receiving entity may predict that the remaining steps in the PRACH/RACH procedure would also utilize the same beam configuration, which may cause degradation or loss to some RACH messages if the remaining steps are performed with different beam configurations. Therefore, improvements in generating the correct configuration may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods for receiving a Physical Downlink Control Channel (PDCCH) order for a MSG 1 transmission having a first Demodulation Reference Signal (DMRS) that is quasi co-located with a first reference signal, and receiving a corresponding RACH message having a second DMRS that is quasi co-located with a second reference signal, wherein the first reference signal and second reference signal are different.

Other aspects of the present disclosure include apparatuses including a memory, a transceiver, and one or more processors operatively coupled with the memory and the transceiver, the one or more processors configured to perform the steps of receiving a PDCCH order for a MSG 1 transmission having a first DMRS that is quasi co-located with a first reference signal, and receiving a corresponding RACH message having a second DMRS that is quasi co-located with a second reference signal, wherein the first reference signal and second reference signal are different.

An aspect of the present disclosure includes an apparatus including means for receiving a PDCCH order for a MSG 1 transmission having a first DMRS that is quasi co-located with a first reference signal, and means receiving a corresponding RACH message having a second DMRS that is quasi co-located with a second reference signal, wherein the first reference signal and second reference signal are different.

Some aspects of the present disclosure include anon-transitory computer readable medium storing code executable by one or more processors including code for receiving a PDCCH order for a MSG 1 transmission having a first DMRS that is quasi co-located with a first reference signal, and code receiving a corresponding RACH message having a second DMRS that is quasi co-located with a second reference signal, wherein the first reference signal and second reference signal are different.

In a non-limiting aspect of the present disclosure, a method of wireless communication may include receiving an order for a transmission of a first message having a first message reference signal that is quasi co-located with a first reference signal, and receiving a corresponding second message having a second message reference signal that is quasi co-located with a second reference signal, wherein the first reference signal and the second reference signal are different.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
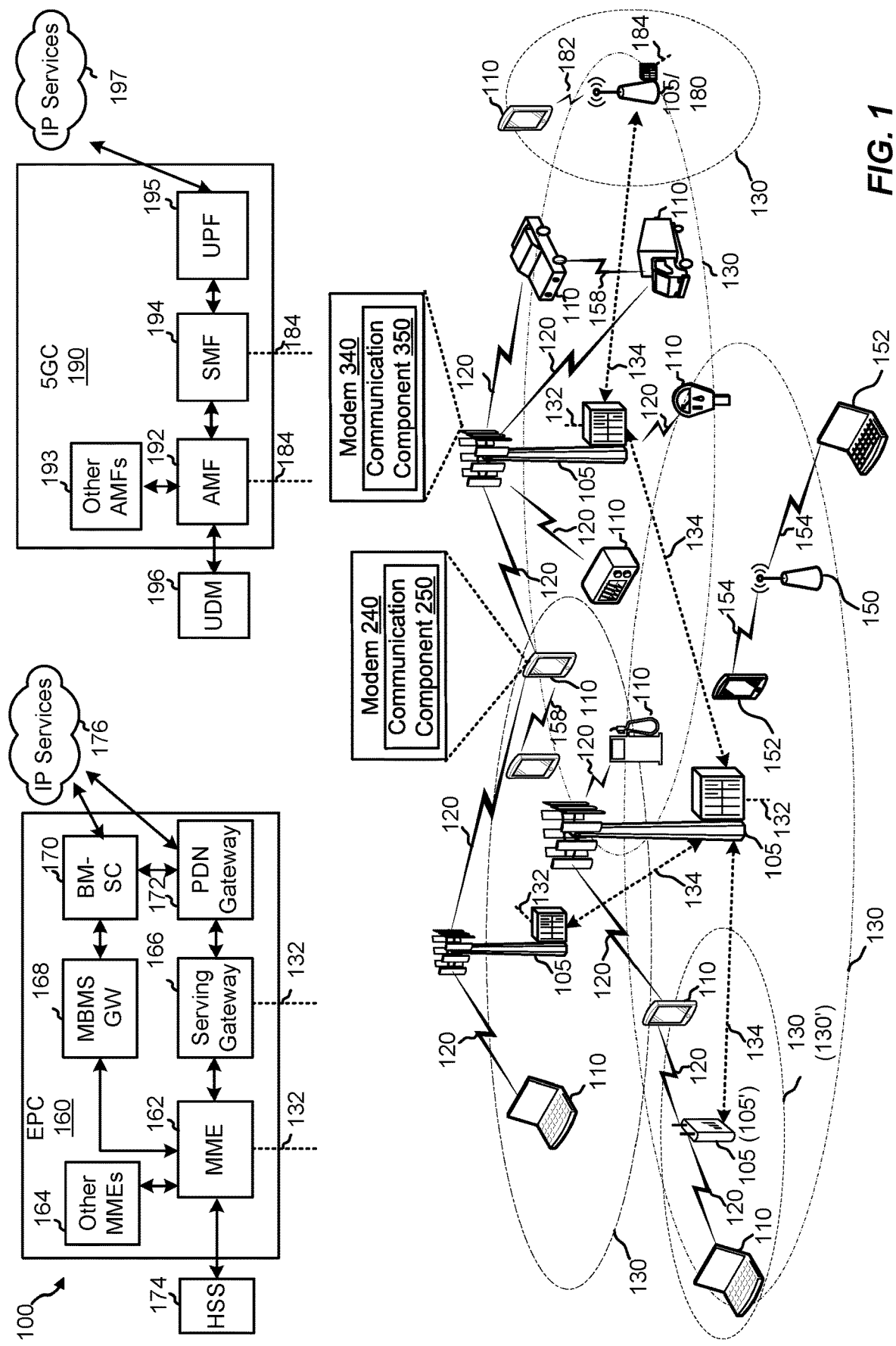
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium, such as a computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In some implementations, when the PDCCH order that triggers RACH MSG1 are in the same cell as the RACH MSG1, the DMRS of RACH MSG2 and the PDCCH order may be quasi co-located. If the PDCCH order triggers MSG2 in a secondary cell, the RACH MSG2 coming through the primary cell and/or the DMRS of the RACH MSG2 may not be quasi co-located with the DMRS of the PDCCH order. In some instances, the DMRS of the RACH MSG2 may follow the quasi co-location properties (e.g., beam direction, beam configurations) of the CORESET associated with the type-1 PDCCH common search space set of the primary cell. An advantage of the present disclosure may provide a default antenna/beam configuration to the UE for the RACH procedure when multiple cells are used. For example, the when the PDCCH order is from a first cell and the RACH message (e.g., MSG2) is from a second cell, the UE may use the default antenna/beam configurations for receiving the RACH message.

In a non-limiting aspect of the present disclosure, a method of wireless communication may include receiving an order for a transmission of a first message having a first message reference signal that is quasi co-located with a first reference signal, and receiving a corresponding second message having a second message reference signal that is quasi co-located with a second reference signal, wherein the first reference signal and the second reference signal are different.

Referring to FIG. 1, an example of a wireless communications system and an access network 100 includes a UE 110 executing a communication component 250 to perform a random access procedure to establish a communication link with a base station 105 executing a corresponding communication component 350. In particular, as discussed in detail below, aspects of the present disclosure provides a default antenna/beam configurations when multiple cells participate in the RACH procedure.

The wireless communications system (also referred to as a wireless wide area network (WWAN)) includes base stations 105, UEs 110, an Evolved Packet Core (EPC) 160, and a 5G Core (5GC) 190. The base stations 105 may include macro cells (high power cellular base station) and/or small cells (low power cellular base station). The macro cells include base stations. The small cells include femtocells, picocells, and microcells.

The base stations 105 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 105 configured for 5G NR (collectively referred to as Next Generation RAN (NG-RAN)) may interface with 5GC 190 through backhaul links 184. In addition to other functions, the base stations 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 105 may communicate directly or indirectly (e.g., through the EPC 160 or 5GC 190) with each other over backhaul links 134 (e.g., X2 interface). The backhaul links 134 may be wired or wireless.

The base stations 105 may wirelessly communicate with the UEs 110. Each of the base stations 105 may provide communication coverage for a respective geographic coverage area 130. There may be overlapping geographic coverage areas 130. For example, the small cell 105' may have a coverage area 130' that overlaps the coverage area 130 of one or more macro base stations 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 105 and the UEs 110 may include uplink (UL) (also referred to as reverse link) transmissions from a UE 110 to a base station 105 and/or downlink (DL) (also referred to as forward link) transmissions from a base station 105 to a UE 110. The communication links 120 may use multiple-input and multiple-output (MIMO) antenna technology, including spatial multiplexing, beamforming, and/or transmit diversity. The communication links may be through one or more carriers. The base stations 105/UEs 110 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell and a secondary component carrier may be referred to as a secondary cell.

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A base station 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Certain aspects of the disclosure includes a QCL relationship in a Physical Downlink Control Channel (PDCCH) ordered RACH procedure. In some implementations, in the RACH procedure, the UE 110 may execute communication component 250 to transmit and receive messages (MSGs) 2 to 4 using similar beams as MSG 1. For PDCCH ordered RACH, MSG 1's transmit/receive (TX/RX) beam may be similar to the beam used in synchronization signal block (SSB) communications. However, in some instances, MSG 1 may be transmitted, by the UE 110 executing communication component 250, in a different band as MSGs 2 to 4. For example, MSG 1 may be transmitted in a frequency band 1 (FR1) and MSGs 2 to 4 may be transmitted/received via frequency band 2 (FR2). In another example, MSG 1 may be transmitted in a Carrier Aggregation (CA) subband of FR1 and MSGs 2 to 4 may transmitted/received via another CA subband of FR1. FR1 and FR2 may be inter-band or intra-band frequency bands.

In one example, if the UE 110 via execution of communication component 250 detects a downlink control indicator (DCI) format 1_0 with the cyclic redundancy check (CRC) scrambled by a corresponding Random Access Radio Network Temporary Identifier (RA-RNTI) and receives a corresponding Physical Downlink Shared Channel (PDSCH) that includes the Downlink Shared Channel (DL-SCH) transport block, the UE 104 may expect the same DMRS antenna port quasi co-location properties for a Synchronization Signal (SS) block, a Physical Broadcast Channel (PBCH) block, or a Channel State Information Reference Signal (CSI-RS) resource the UE used for PRACH association, regardless of whether or not the higher layer parameter TCI-States PDCCH is provided for the Control Resource Set (CORESET) where the PDCCH is received.

In another example, if the UE 110 via execution of communication component 250 attempts to detect the DCI format 1_0 with CRC scrambled by the corresponding RA-RNTI in response to a PRACH transmission initiated by a PDCCH order that triggers non-contention based RACH procedure, the UE 110 may expect that the PDCCH and the PDCCH order have same DMRS antenna port quasi co-location properties.

In certain implementations, when receiving a PDSCH scheduled with RA-RNTI, the UE 110 via execution of communication component 250 may expect that the DMRS port of the PDSCH is quasi co-located with the SS/PBCH block or the CSI-RS resource the UE used for RACH association and transmission with respect to Doppler shift, Doppler spread, average delay, delay spread, and/or spatial RX parameters.

In some implementations, when receiving a PDSCH scheduled with RA-RNTI in response to a RACH procedure triggered by a PDCCH order, which triggers a non-contention based RACH procedure, the UE 110 via execution of communication component 250 may expect that the DMRS port of the received PDCCH order and the DMRS ports of PDSCH of the corresponding PDSCH scheduled with RA-RNTI are quasi co-located with the same SS/PBCH block or CSI-RS with respect to Doppler shift, Doppler spread, average delay, delay spread, and/or spatial RX parameters.

In other implementations, when receiving a PDSCH scheduled with a temporary cell (TC) RNTI, the UE may expect that the DMRS port of PDSCH is quasi co-located with the SS/PBCH block the UE 110, via execution of communication component 250, selected for RACH association and transmission with respect to Doppler shift, Doppler spread, average delay, delay spread, and/or spatial RX parameters.

In some examples, MSGs 1 and 3 may be transmitted with similar beams, i.e., the difference between the parameters of the beam for MSG 1 (e.g., Doppler shift, Doppler spread, average delay, delay spread, and/or spatial RX parameters) the corresponding parameters of the beam for MSG 3 may be within a certain percentage. In some examples, the percentage difference may be 1%, 2%, 3%, 5%, or 10%.

In other examples, the UL TX beams of MSGs 1 and 3 may be similar to DL RX beams for MSGs 2 and 4. In some examples, the percentage difference between the parameters of the UL TX beams and the DL RX beams may be 1%, 2%, 3%, 5%, or 10%.

In some implementations, it may be possible for the network, e.g., base station 105 via execution of communication component 350, to pre-define the beams used for MSGs 2 to 4 TX/RX. In an example, the PDCCH order may be received via the SCell on FR2. The MSG 1 may be transmitted via the SCell on FR2 or the special cell (sPCell) on FR1. The sPCell may include primary secondary cell (PSCell) or the PCell. The PDCCH for MSG 2 may be from sPCell, and the UE 110 may require a predefined QCL, including existing CORESET(s) defined in FR1 including CORESET 0, type 1 search space if configured.

Thus, the UE 110 may utilize the quasi co-located properties of the CORESET associated with the Type-1 PDCCH common search space set for receiving the PDCCH that includes the DCI format 1_0, such as the DMRS of the RACH MSG2.

Figure 2:
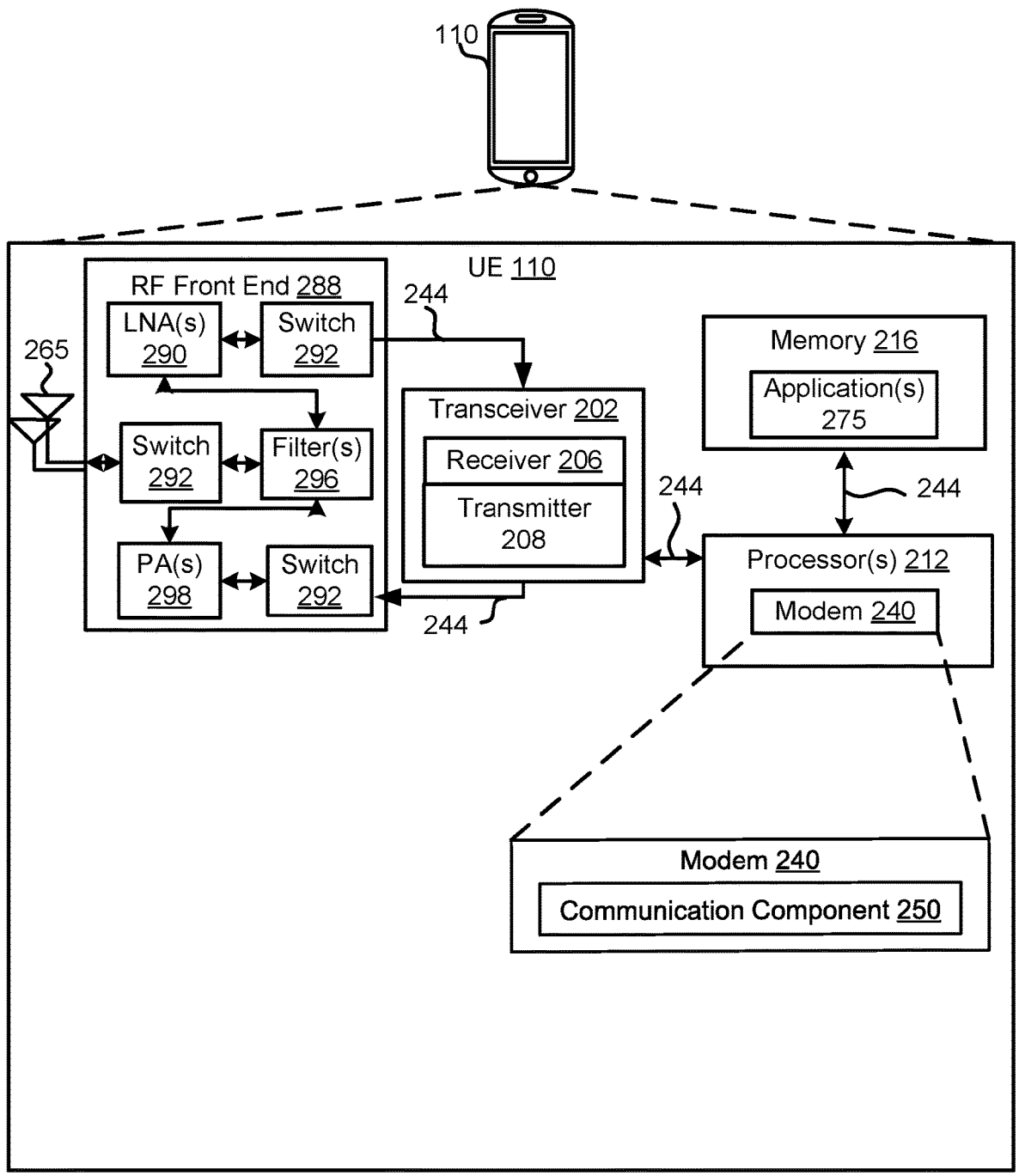
FIG. 2 is a schematic diagram of an example of a user equipment.
Figure 3:
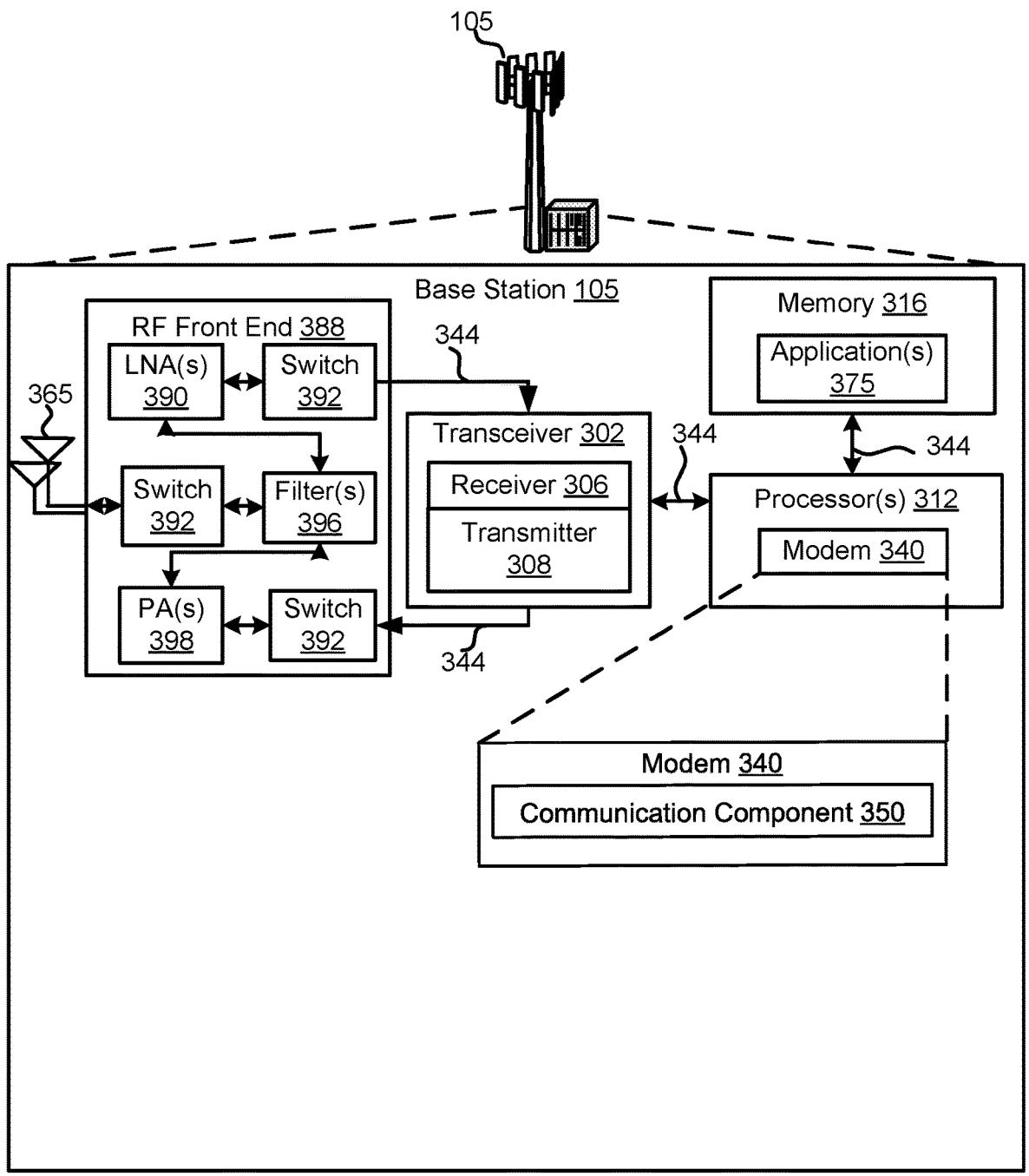
FIG. 3 is a schematic diagram of an example of a base station.

Referring to FIGS. 2 and 3, one example of an implementation of the UE 110 may include a modem 240 having a communication component 250 configured to perform the random access procedures described herein. The communication component 250 may be configured to communicate with the other UEs 110 and/or base stations 105, such as sending/receiving messages to the other UEs 110 and/or base stations 105. The wireless network 100 may include at least one base station 105 including a modem 340 with a communication component 350 configured to perform the random access procedures described herein. The communication component 350 may be configured to communicate with one or more UEs 110 and/or other base stations 105, such as sending/receiving messages to the UEs 110 and/or other base stations 105. The modem 340 of a base station 105 may be configured to communicate with other base stations 105 and UEs 110 via a cellular network, a Wi-Fi network, or other wireless and wired networks. The modem 240 of a UE 110 may be configured to communicate with the base stations 105 via a cellular network, a Wi-Fi network, or other wireless and wired networks. The modems 240, 340 may receive and transmit data packets.

Turning now to FIG. 2, in some implementations, the UE may include a variety of components, some of which have already been described above, but including components such as one or more processors 212 and memory 216 and transceiver 202 in communication via one or more buses 244, which may operate in conjunction with the modem 240 and the communication component 250 to enable one or more of the functions described herein related to communicating with the base station 105. Further, the one or more processors 212, modem 240, memory 216, transceiver 202, RF front end 288 and one or more antennas 265, may be configured to support voice and/or data calls (simultaneously or non-simultaneously) in one or more radio access technologies.

In an aspect, the one or more processors 212 may include the modem 240 that uses one or more modem processors. The various functions related to the communication component 250 may be included in the modem 240 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. Additionally, the modem 240 may configure the UE 110. In other aspects, some of the features of the one or more processors 212 and/or the modem 240 associated with the communication component 250 may be performed by transceiver 202.

Also, memory 216 may be configured to store data used herein and/or local versions of applications 275 or the communication component 250 and/or one or more subcomponents of the communication component 250 being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 250 and/or one or more of the subcomponents, and/or data associated therewith, when UE 110 is operating at least one processor 212 to execute the communication component 250 and/or one or more of their subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one base station 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more base stations 105 or one or more cells associated with one or more base stations 105. In an aspect, for example, the modem 240 may configure transceiver 202 to operate at a specified frequency and power level based on the UE configuration of the UE 110 and the communication protocol used by the modem 240.

In an aspect, the modem 240 may be a multiband-multimode modem, which may process digital data and communicate with transceiver 202 such that the digital data is sent and received using transceiver 202. In an aspect, the modem 240 may be multiband and be configured to support multiple frequency bands for a specific communications protocol. In an aspect, the modem 240 may be multimode and be configured to support multiple operating networks and communications protocols. In an aspect, the modem 240 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Referring to FIG. 3, one example of an implementation of may include a variety of components, some of which have already been described above, but including components such as one or more processors 312 and memory 316 and transceiver 302 in communication via one or more buses 344, which may operate in conjunction with the modem 340 and the communication component 350 to enable one or more of the functions described herein related to communicating with the UE 110. Further, the one or more processors 312, modem 340, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 340 that uses one or more modem processors. The various functions related to the communication component 350 may be included in the modem 340 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. Additionally, the modem 340 may configure the base station 105 and processors 312. In other aspects, some of the features of the one or more processors 312 and/or the modem 340 associated with the communication component 350 may be performed by transceiver 302.

Also, memory 316 may be configured to store data used herein and/or local versions of applications 375 or the communication component 350 and/or one or more subcomponents of the communication component 350 being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 350 and/or one or more of the subcomponents, and/or data associated therewith, when the base station 105 is operating at least one processor 312 to execute the communication component 350 and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the base station 105 may include RF front end 388, which may operate in communication with one or more antennas 365 and transceiver 302 for receiving and transmitting radio transmissions, for example, wireless communications transmitted by other base stations 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that base station 105 may communicate with, for example, the UE 110 or one or more cells associated with one or more base stations 105. In an aspect, for example, the modem 340 may configure transceiver 302 to operate at a specified frequency and power level based on the base station configuration of the base station 105 and the communication protocol used by the modem 340.

In an aspect, the modem 340 may be a multiband-multimode modem, which may process digital data and communicate with transceiver 302 such that the digital data is sent and received using transceiver 302. In an aspect, the modem 340 may be multiband and be configured to support multiple frequency bands for a specific communications protocol. In an aspect, the modem 340 may be multimode and be configured to support multiple operating networks and communications protocols. In an aspect, the modem 340 may control one or more components of the base station 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the base station 105.

Figure 4:
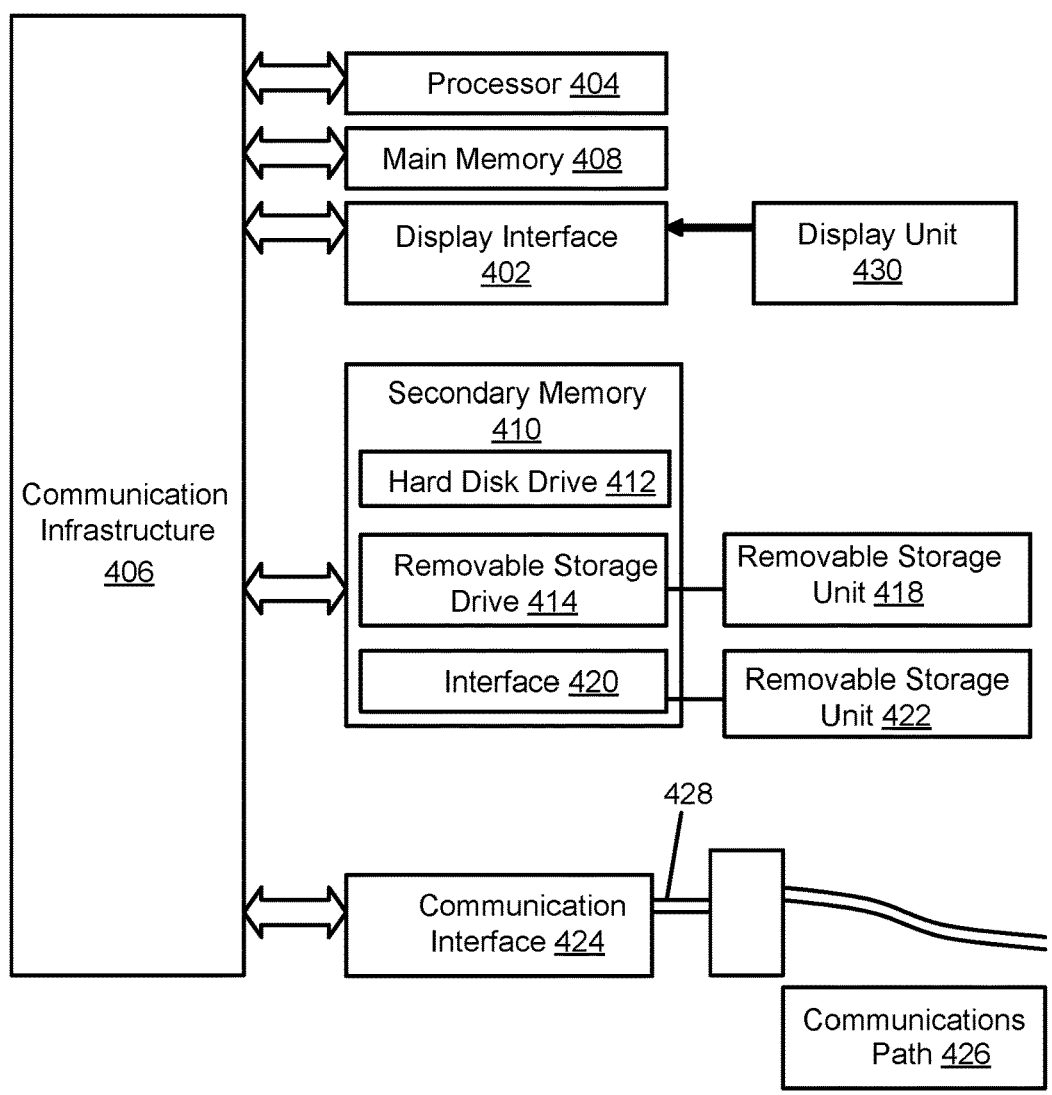
FIG. 4 is a schematic diagram of an example of a computer system for implementing a core network.

Referring now to FIG. 4, the core network 115 may be implemented as one or more core network devices, such as an example of a computer system 400. The computer system 400 may be a hardware system, a virtual system, a cloud-based system, or a combination thereof. The computer system 400 includes one or more processors, such as the processor 404. The processor 404 is communicatively coupled with a communication infrastructure 406 (e.g., a communications bus, cross-over bar, or network).

The computer system 400 may include a display interface 402 that forwards graphics, text, and other data from the communication infrastructure 406 (or from a frame buffer not shown) for display on a display unit 430. Computer system 400 also includes a main memory 408, preferably random access memory (RAM), and may also include a secondary memory 410. The secondary memory 410 may include, for example, a hard disk drive 412, and/or a removable storage drive 414, representing a floppy disk drive, magnetic tape drive, optical disk drive, universal serial bus (USB) flash drive, etc. The removable storage drive 414 reads from and/or writes to a first removable storage unit 418 in a well-known manner. The first removable storage unit 418 represents a floppy disk, magnetic tape, optical disk, USB flash drive etc., which is read by and written to removable storage drive 414. As will be appreciated, the first removable storage unit 418 includes a computer usable storage medium having stored therein computer software and/or data.

Alternative aspects of the present disclosure may include secondary memory 410 and may include other similar devices for allowing computer programs or other instructions to be loaded into computer system 400. Such devices may include, for example, a second removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units (not shown) and interfaces 420, which allow software and data to be transferred from the second removable storage unit 422 to computer system 400.

Computer system 400 may also include a communications interface 424.

Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical or other signals capable of being received by communications interface 424. These signals 428 are provided to communications interface 424 via a communications path (e.g., channel) 426. This path 426 carries signals 428 and may be implemented using one or more of a wire or cable, fiber optics, telephone line, cellular link, RF link and/or other communications channels. In this document, the terms "computer program medium" and "computer usable medium" are used to refer generally to media such as the first removable storage drive 418, a hard disk installed in hard disk drive 412, and signals 428. These computer program products provide software to the computer system 400. Aspects of the present disclosure are directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features in accordance with aspects of the present disclosure, as discussed herein. In particular, the computer programs, when executed, enable the processor 404 to perform the features in accordance with aspects of the present disclosure. Accordingly, such computer programs represent controllers of the computer system 400.

In an aspect of the present disclosure where the method is implemented using software, the software may be stored in a computer program product and loaded into computer system 400 using removable storage drive 414, hard drive 412, or communications interface 420. The control logic (software), when executed by the processor 404, causes the processor 404 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 5:
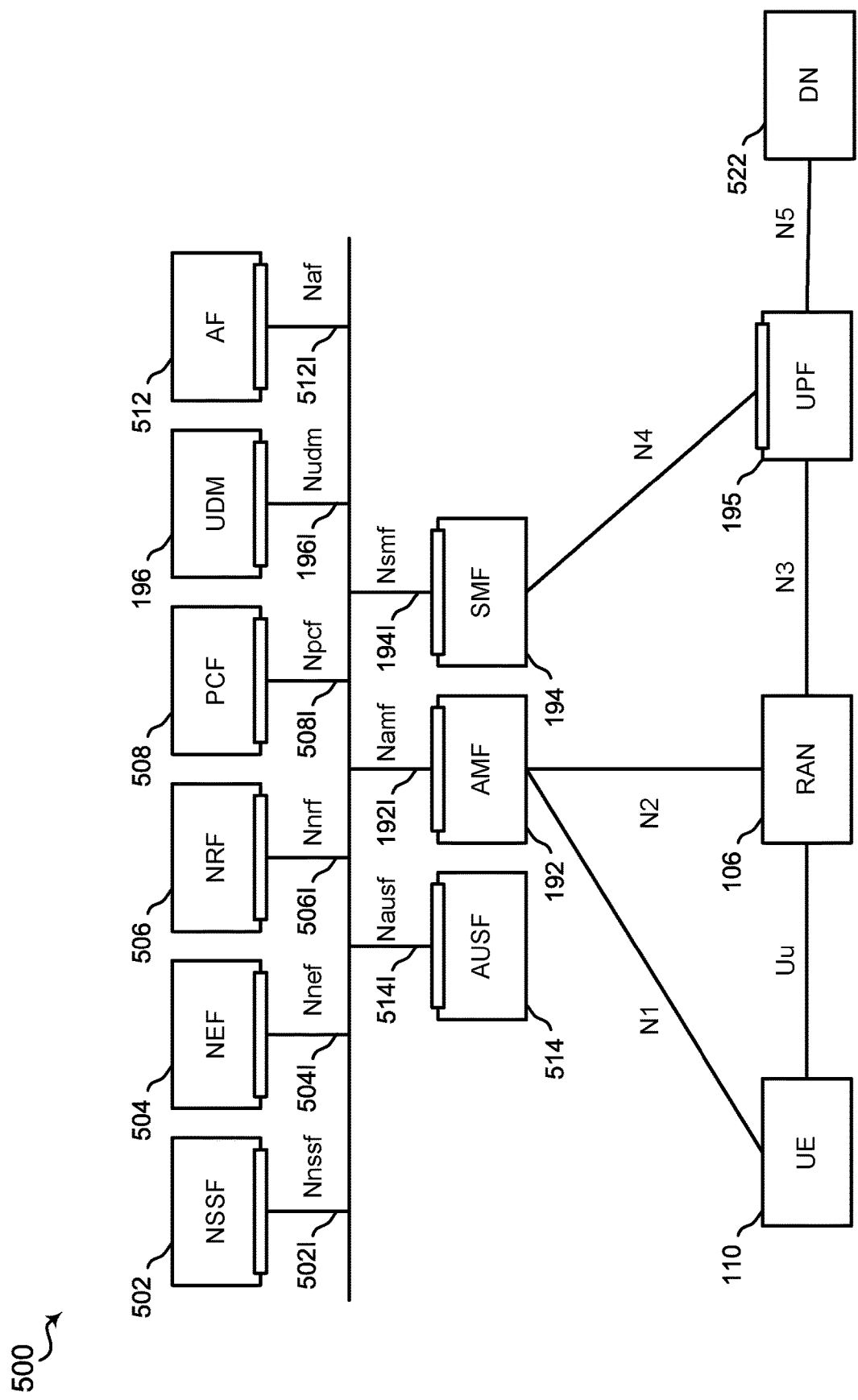
FIG. 5 is an example of a functional diagram illustrating the service-based architecture (SBA)

Turning now to FIG. 5, a service based architecture (SBA) 500 of the wireless communication network 100 may include a number of interconnected network functions (NFs). The SBA 500 may include a network slice selection function (NSSF) 502 that may support the selection of the network slice instances to serve the one or more UEs 110, and determines the allowed network slice selection assistance information and the access and mobility management function (AMF) set to be used to serve the one or more UEs 110. The NSSF 502 may communicate with other functions within the SBA 500 via a Nnssf 502I interface. The SBA 500 may include a network exposure function (NEF) 504 that may support exposure of capabilities and events, secure provision of information from external application to various wireless communication networks, and translation of internal and external information. The NEF 504 may communicate with other functions within the SBA 500 via a Nnef 504I interface.

Still referring to FIG. 5, the SBA 500 may include a network function repository function (NRF) 506 that may support service discovery functions and may maintain NF profiles and available NF instances. The NRF 506 may communicate with other functions within the SBA 500 via a Nnrf 506I interface. The SBA 500 may include a policy control function (PCF) 508 that may support unified policy framework, provide policy rules to control plane (CP) functions, access subscription information for policy decisions in unified data repository (UDP). The PCF 508 may communicate with other functions within the SBA 500 via a Npcf 508I interface.

Still referring to FIG. 5, the SBA 500 may include the UDM 196 that may support the generations of authentication and key agreement (AKA) credentials, user identification handling, access authorization, and subscription management. The UDM 196 may communicate with other functions within the SBA 500 via a Nudm 196I interface. The SBA 500 may include an application function (AF) 512 that may support application influence on traffic routing and interaction with policy framework for policy control. The AF 512 may communicate with other functions within the SBA 500 via a Naf 512I interface.

Still referring to FIG. 5, the SBA 500 may include an authentication server function (AUSF) 514 that may serve as an authentication server. The AUSF 514 may communicate with other functions within the SBA 500 via a Nausf 514I interface. The SBA 500 may include the AMF 192 that may support the termination of non-access-stratum (NAS) signaling, NAS ciphering and integrity protection, registration management, connection management, mobility management, access authentication and authorization, security context management. The AMF 192 may communicate with other functions within the SBA 500 via a Namf 192I interface. The AMF 192 may also communicate with the UE 110 via the N1 interface and a RAN 106 with the N2 interface.

The RAN 106 may be a network entity residing between the core network 115 and the UE 110. The RAN 106 may be implemented, for example, by the base station 105. The RAN 106 may relay data between the core network 115 and the UE 110.

Still referring to FIG. 5, the SBA 500 may include the SMF 194 that may support session management (session establishment, modification, release), UE internet protocol (IP) address allocation & management, dynamic host configuration protocol functions, termination of NAS signaling related to session management, downlink data notification, traffic steering configuration for UPF for proper traffic routing. The SMF 194 may communicate with other functions within the SBA 500 via a Nsmf 194I interface. The SBA 500 may include the UPF 195 that may support packet routing & forwarding, packet inspection, quality of service (QoS) handling, act as the external PDU session interface to the data network (DN) 522, and is an anchor point for both intra radio access technology (RAT) and inter-RAT mobility. The UPF 195 may communicate with the SMF 194 via a N4 interface, the DN 522 via the N5 interface, and the RAN 106 via the N3 interface.

In some implementations, the RAN 106 and the UE 110 may communicate via the Uu (wireless radio or "air") interface.

Figure 6:
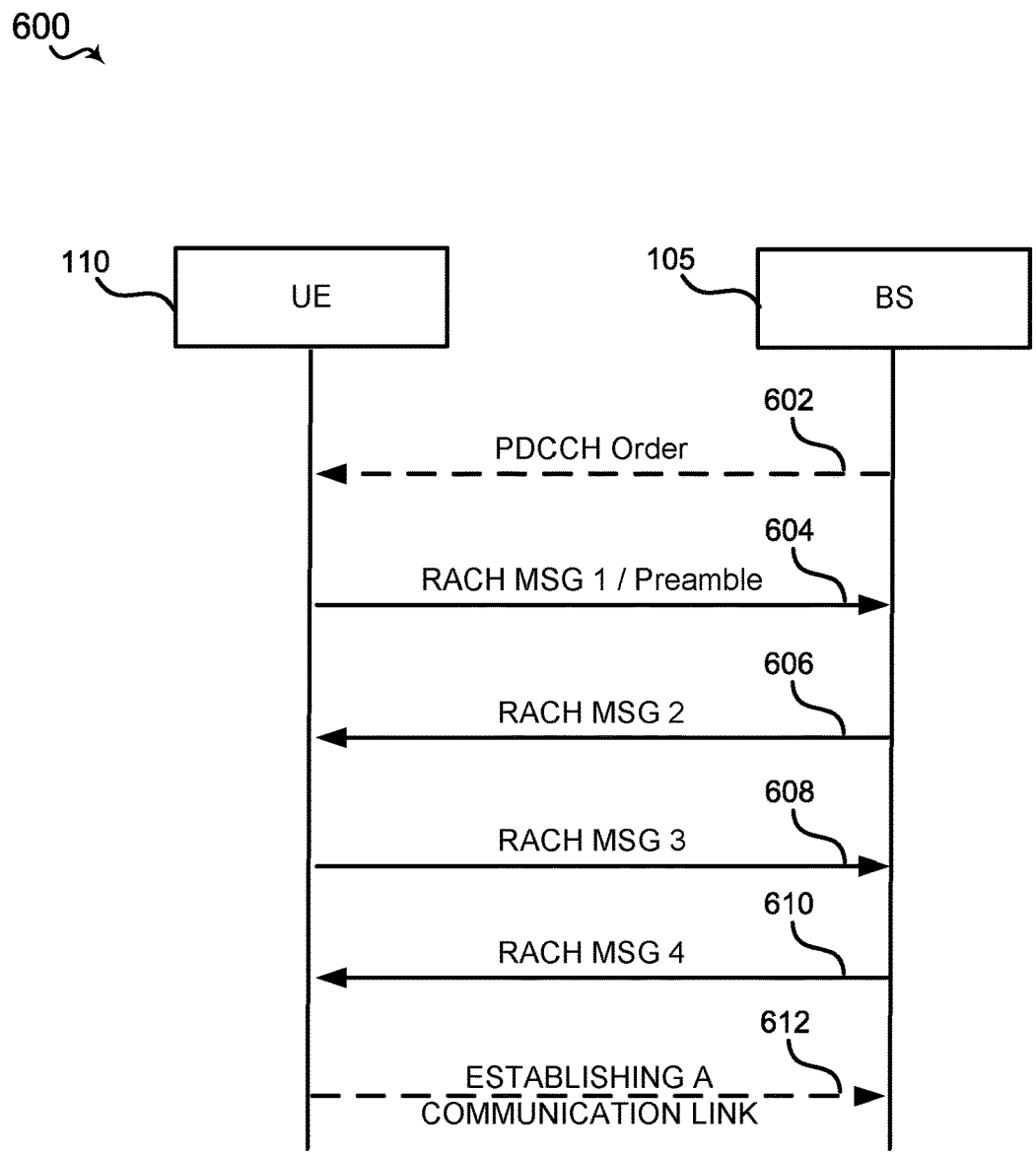
FIG. 6 illustrates an example of a message flow diagram of a random access channel (RACH) procedure.

Turning now to FIG. 6, a message flow diagram 600 includes examples of messages exchanged between the UE 110 and the BS 105 during the RACH procedure. The message flow may be performed by one or more of the modems 240, 340, and the communication components 250, 350. In some implementations, at block 602, the BS 105 may optionally transmit a PDCCH order to the UE 110 to force the UE 110 to initiate the RACH procedure. The PDCCH order may include one or more of the following information: a format differentiator, a PDSCH scheduling type, resource block assignments, modulation and/or coding scheme, transport block size indices, a Hybrid Automatic Repeat Request (HARQ) process number, a new data indicator, redundancy information, Physical Uplink Control Channel (PUCCH) power control parameters, and/or downlink assignment index.

After receiving the PDCCH order, at block 604, the UE 110 may transmit a MSG1 of the RACH procedure to the remote device 110b. During the MSG1 transmissions, the MSG1 may include a preamble index randomly selected by the UE 110 from a predetermined list of preamble indices, for example.

Next, at block 606, the BS 105 may transmit a MSG2 to the UE 110 in response to receiving the MSG1. The MSG2 may include a random access response (RAR), which may include a random access radio network temporary identifier (RA-RNTI), a timing advance value, media access control data, a back-off indicator, and/or other information for the local device 110a. The RAR may include a first signal corresponding to a RAR grant on a first physical channel, e.g., the RAR Narrowband Physical Downlink Control Channel (NPDCCH), and a second signal on a second physical channel, e.g., the RAR Narrowband Physical Downlink Shared Channel (NPDSCH).

At block 608, the UE 110 may transmit a MSG3 that may include a connection request, e.g., a radio resource control (RCC) connection request, to the BS 105.

At block 610, the BS 105 may transmit a MSG4 back to the UE 110 in response to receiving the MSG3. The MSG4 may include an acknowledgement and/or a contention resolution identifier (ID) to alleviate any random access contention the BS 105 may have with other devices (e.g., other UEs 110) attempting random access.

At block 612, the UE 110 may optionally establish a communication link with the BS 105 in response to receiving the MSG4. The UE 110 may receive a radio network identifier from the BS 105 used to establish the communication link with the BS 105.

Figure 7:
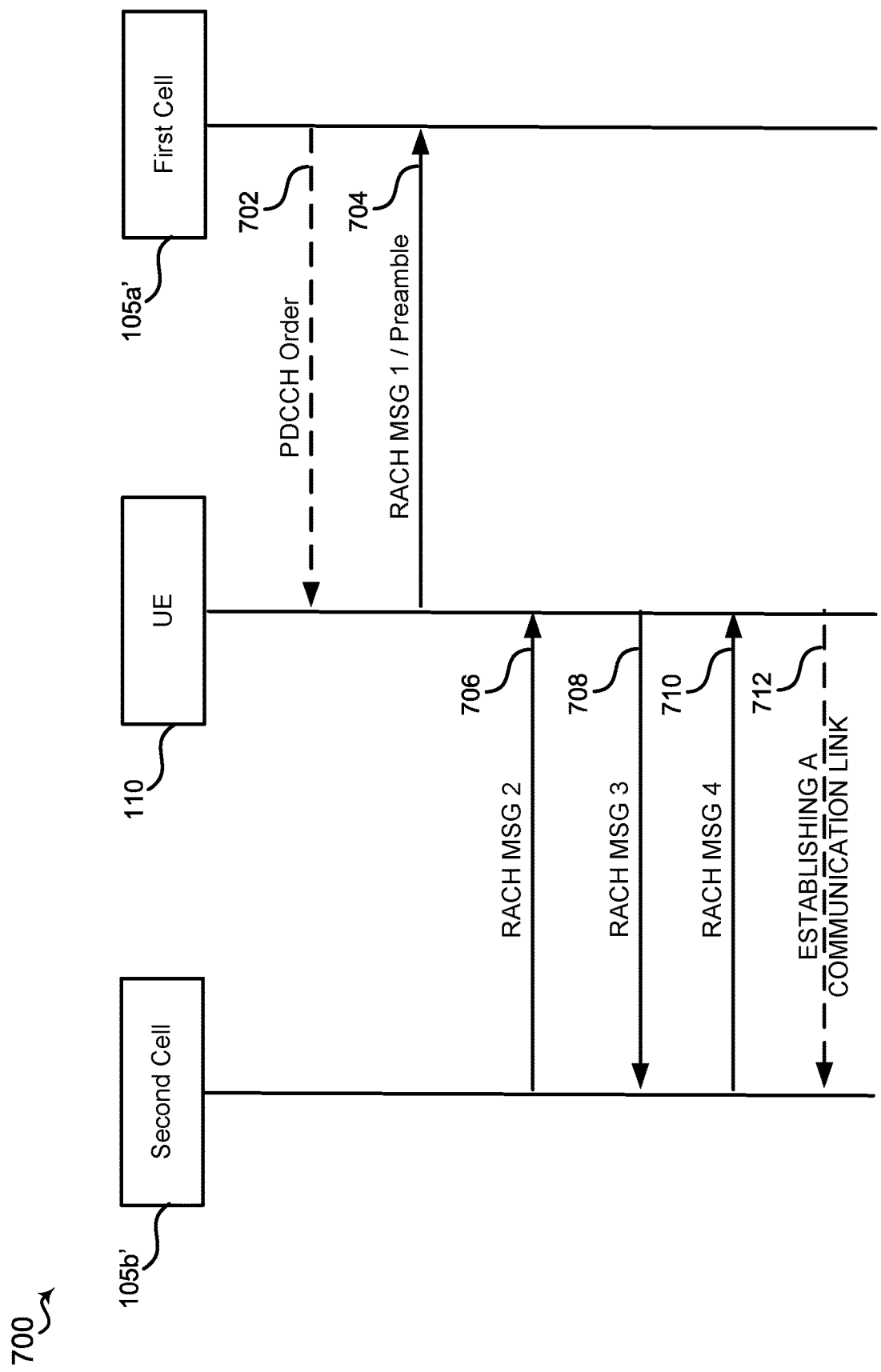
FIG. 7 illustrates an example of a flow diagram for implementing pre-defined QCL beam configuration.

Turning to FIG. 7, in a particular implementation, an example of a flow diagram 700 for implementing pre-defined QCL beam configuration may include the UE 110 connected to a first cell 105a' and a second cell 105b'. The message flow may be performed by one or more of the modems 240, 340, and the communication components 250, 350. The first cell 105a' may be a secondary serving cell (SCell) to the UE 110 and the second cell 105b' may be a special cell (sPCell). Other types of cells are possible for the first cell 105a' and/or the second cell 150b', such as PCell, for example. The first cell 105a' and the second cell 105b' may share the same BS 105, or may be implemented by different BSs 105.

Still referring to FIG. 7, in a non-limiting example, at block 702, the UE 110 may receive the PDCCH order from the first cell 105a'. The PDCCH order may be transmitted by the first cell 105a' via a first group of beams having a first beam configuration.

At block 704, the UE 110 may transmit a MSG 1 to the first cell 105a'. The MSG 1 may be transmitted by the first group of beams having the first beam configuration. The first beam configuration may be stored in the UE 110.

At block 706, the UE 110 may receive a MSG 2 from the second cell 105b' via a second group of beams having a second beam configuration. The second beam configuration may be substantially similar to a pre-defined beam configuration. For example, the DMRS of the MSG 2 PDCCH and the MSG 2 PDSCH may be quasi co-located with a reference signal previously sent to the UE 110. The reference signal may be transmitted to the UE 110 via the Remaining Minimum System Information (RMSI), the Other System Information (OSI), Media-Access-Control Control Element (MAC-CE), Radio Resource Control (RRC), or a handover report. The reference signal may include time and frequency resources. One or more parameters of the DMRS of MSG 2 PDCCH/PDSCH and the corresponding one or more parameters of the reference signal may be within a certain percentage, such as 1%, 2%, 3%, 5%, or 10%.

In certain examples, the reference signal may be a reference signal for the second cell 105b' (e.g., sPCell). The reference signal may be independent of the transmission configuration indication (TCI) states of the DMRS of the PDCCH order in the first cell 105a' (e.g., SCell). In some examples, the reference signal may be mapped from the TCI states of the DMRS of the PDCCH order.

In one aspect of the present disclosure, the DMRS of the RACH MSG 2 may be quasi co-located with the CORESET associated with the type 1 PDCCH common search space set of the first cell 105a' as described above. In other words, the DMRS of the RACH MSG 2 may follow the QCL properties (e.g., beam configurations, beam directions, etc.) of the CORESET associated with the type 1 PDCCH common search space set of the first cell 105a'.

At block 708, the UE 110 may transmit a MSG 3 to the second cell 105b'. In some implementations, the UL TX beams of the MSG 3 may be different from the UL TX beams (i.e., the first group of beams) of the MSG 1. In certain implementations, the UL TX beams of the MSG 3 may be substantially similar to the DL TX beams (i.e., the second group of beams) of the MSG 2 or to the pre-defined beam configuration. One or more parameters of the DMRS of MSG 3 PDCCH and the corresponding one or more parameters of the reference signal may be within a certain percentage, such as 1%, 2%, 3%, 5%, or 10%.

At block 710, the UE 110 may receive a MSG 4 from the second cell 105b'. In certain examples, the DL TX beams of the MSG 4 may be substantially similar to the DL TX beams (i.e., the second group of beams) of the MSG 2 or to the pre-defined beam configuration. One or more parameters of the DMRS of MSG 4 PDCCH/PDSCH and the corresponding one or more parameters of the reference signal may be within a certain percentage, such as 1%, 2%, 3%, 5%, or 10%.

At block 712, the UE 110 may optionally establish a communication link with the BS 105 in response to receiving the MSG4. The UE 110 may receive a radio network identifier from the BS 105 used to establish the communication link with the BS 105.

Figure 8:
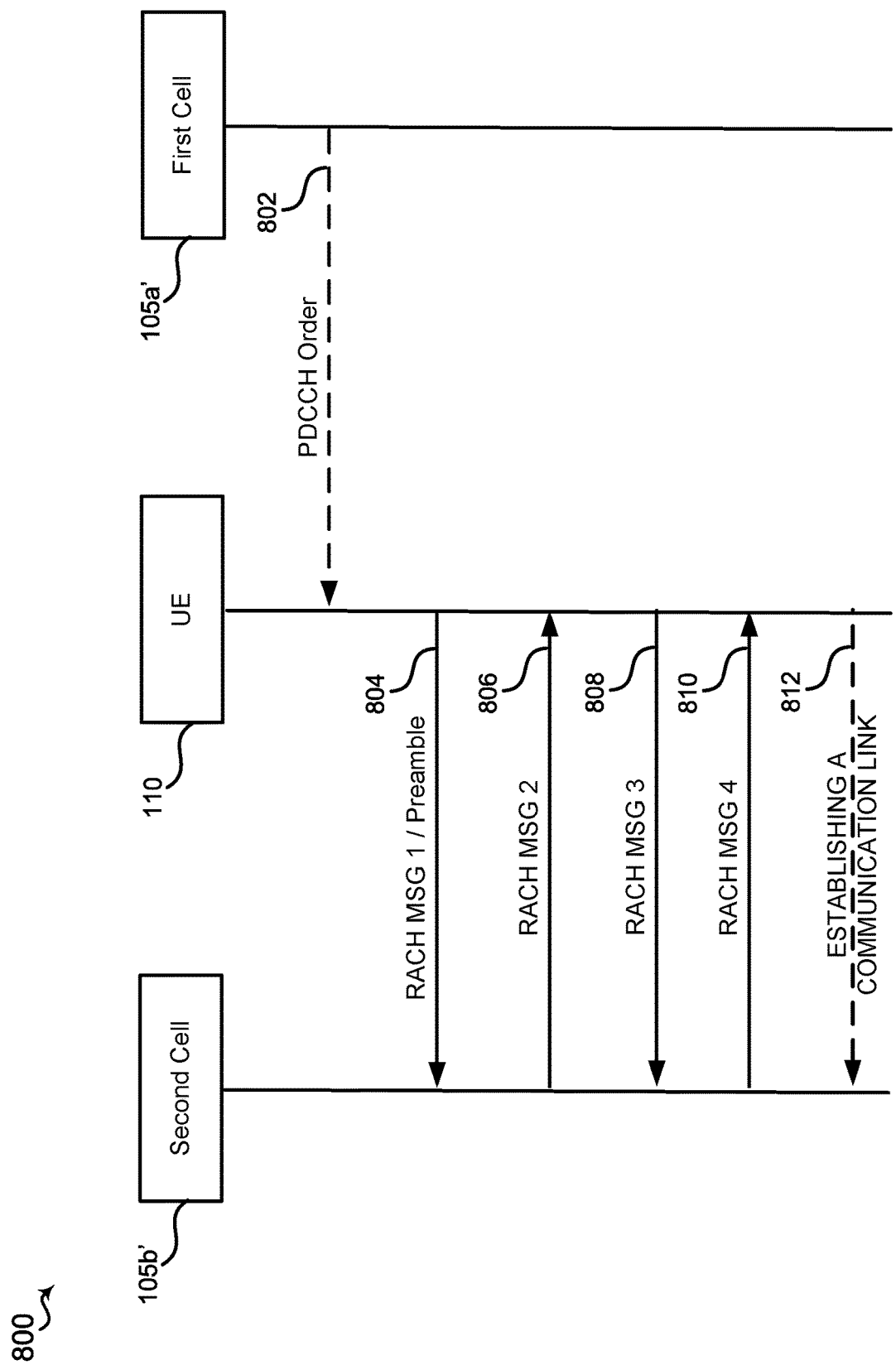
FIG. 8 is another example of a flow diagram for implementing pre-defined QCL beam configuration.

Turning to FIG. 8, in a particular implementation, another example of an environment 800 for implementing pre-defined QCL beam configuration may include the UE 110 connected to the first cell 105a' and the second cell 105b'. The message flow may be performed by one or more of the modems 240, 340, and the communication components 250, 350. The first cell 105a' may be a SCell to the UE 110 and the second cell 105b' may be a special cell (sPCell). The first cell 105a' and the second cell 105b' may share the same BS 105, or may be implemented by different BSs 105.

Still referring to FIG. 8, in a non-limiting example, at block 802, the UE 110 may receive the PDCCH order from the first cell 105a'. The PDCCH order may be transmitted by the first cell 105a' via a first group of beams having a first beam configuration.

At block 804, the UE 110 may transmit a MSG 1 to the second cell 105b'. The MSG 1 may be transmitted by a second group of beams having a second beam configuration. The second beam configuration may be substantially similar to a pre-defined beam configuration. For example, the DMRS of the MSG 1 PDCCH may be quasi co-located with a reference signal previously sent to the UE 110. The reference signal may be transmitted to the UE 110 via the Remaining Minimum System Information (RMSI), the Other System Information (OSI), Media-Access-Control Control Element (MAC-CE), Radio Resource Control (RRC), or a handover report. The reference signal may include time and frequency resources. One or more parameters of the DMRS of MSG 1 PDCCH and the corresponding one or more parameters of the reference signal may be within a certain percentage, such as 1%, 2%, 3%, 5%, or 10%.

In certain examples, the reference signal may be a reference signal for the second cell 105b' (e.g., sPCell). The reference signal may be independent of the transmission configuration indication (TCI) states of the DMRS of the PDCCH order in the first cell 105a' (e.g., SCell). In some examples, the reference signal may be mapped from the TCI states of the DMRS of the PDCCH order. The reference signal may be used for path loss estimation and MSG 1 power control.

At block 806, the UE 110 may receive a MSG 2 from the second cell 105b'. In some examples, the DL RX beams of the MSG 2 may be substantially similar to the UL TX beams (i.e., the second group of beams) of the MSG 1 or to the pre-defined beam configuration. One or more parameters of the DMRS of MSG 2 PDCCH/PDSCH and the corresponding one or more parameters of the reference signal may be within a certain percentage, such as 1%, 2%, 3%, 5%, or 10%.

In one aspect of the present disclosure, the DMRS of the RACH MSG 2 may be quasi co-located with the CORESET associated with the type 1 PDCCH common search space set of the first cell 105a' as described above. In other words, the DMRS of the RACH MSG 2 may follow the QCL properties (e.g., beam configurations, beam directions, etc.) of the CORESET associated with the type 1 PDCCH common search space set of the first cell 105a'.

At block 808, the UE 110 may transmit a MSG 3 to the second cell 105b'. In some implementations, the UL TX beams of the MSG 3 may be substantially similar to the UL TX beams (i.e., the second group of beams) of the MSG 1 or to the pre-defined beam configuration. One or more parameters of the DMRS of MSG 3 PDCCH and the corresponding one or more parameters of the reference signal may be within a certain percentage, such as 1%, 2%, 3%, 5%, or 10%.

At block 810, the UE 110 may receive a MSG 4 from the second cell 105b'. In certain examples, the DL TX beams of the MSG 4 may substantially similar to the UL TX beams (i.e., the second group of beams) of the MSG 1 or to the pre-defined beam configuration. One or more parameters of the DMRS of MSG 4 PDCCH/PDSCH and the corresponding one or more parameters of the reference signal may be within a certain percentage, such as 1%, 2%, 3%, 5%, or 10%.

In some implementations, the RA-RNTI associated with the PRACH carrying the RACH preamble may be computed as: RA-RNTI=$(1+s\_id)+(14 \times t\_id)+(14 \times 80 \times f\_id)+(14 \times 80 \times 8 \times ul\_carrier\_id)$, where s_id is the index of the first OFDM symbol of the specified PRACH ($0 \leq s\_id < 14$), t_id is the index of the first slot of the specified PRACH in a system frame ($0 \leq t\_id < 80$), f_id is the index of the specified PRACH in the frequency domain ($0 \leq f\_id < 8$), and ul_carrier_id is the UL carrier used for Msg1 transmission (0 for NUL carrier, and 1 for SUL carrier). In an aspect of the present disclosure, MSG 1 may be transmitted in one of one or more SCells and MSGs 2 to 4 may be transmitted in the sPCell. Carrier_ID of RA-RNTI may reside in a range from 0 to N−1 where N is a maximum number of SCells supported in a network.

At block 812, the UE 110 may optionally establish a communication link with the BS 105 in response to receiving the MSG4. The UE 110 may receive a radio network identifier from the BS 105 used to establish the communication link with the BS 105.

Figure 9:
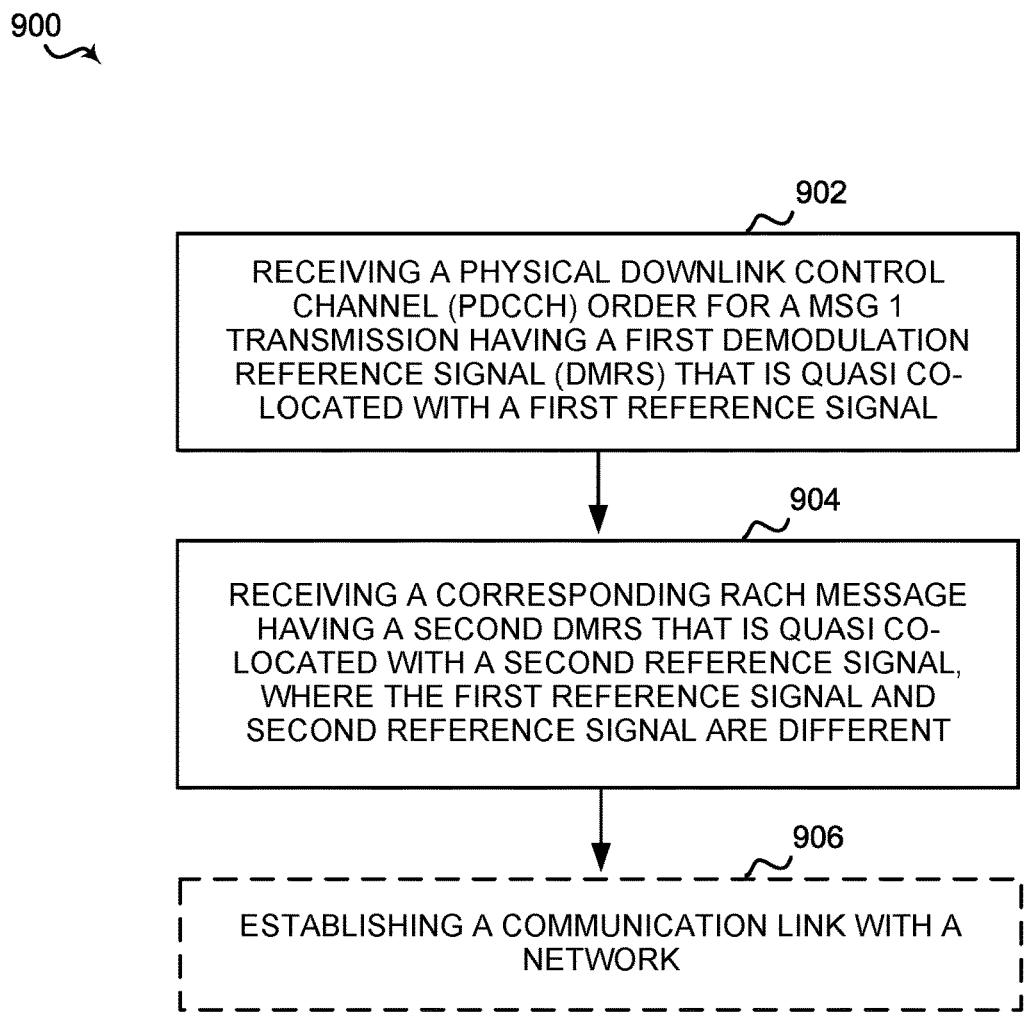
FIG. 9 is a process flow diagram of an example of a method for implementing pre-defined QCL beam configuration.

Turning now to FIG. 9, a method 900 of implementing pre-defined QCL beam configuration may be performed by the UE 110.

At block 902, the method 900 may receive a PDCCH order for a MSG 1 transmission having a first DMRS that is quasi co-located with a first reference signal. For example, the communication component 250 and/or the transceiver 202 of the UE 110 may receive a PDCCH order for a MSG 1 transmission having a first DMRS that is quasi co-located with a first reference signal. As used herein, a DMRS that is "quasi co-located" with a reference signal includes a DMRS having parameters substantially similar to the reference signal. For example, this may include a DMRS having parameters that can be inferred from parameters of another received reference signal, or vice versa. Further, for example, the substantially similar parameters of the DMRS and/or reference signal may include, but are not limited to, Doppler shift, Doppler spread, average delay, delay spread, and/or spatial RX parameters. Additionally, the DMRS and/or reference signal parameters being "substantially similar" may include, but is not limited to, such parameters being within a threshold percentage of one another, e.g., 1%, 2%, 3%, 5%, or 10%. In other words, being "quasi co-located" may refer to such parameters being substantially similar and/or inferable from one to the other. In a non-limiting example, the method 900 may receive an order for a transmission of a first message having a first message reference signal that is quasi co-located with a first reference signal.

In some implementations, QCL information may include spatial parameters for the UE side reception of the CSI-RS ports. QCL may support the following functionalities, such as beam management functionality (including spatial parameters), frequency/timing offset estimation functionality (including Doppler/delay parameters), and radio resource management functionality (e.g., average gain).

At block 904, the method 900 may receive a corresponding RACH message having a second DMRS that is quasi co-located with a second reference signal, wherein the first reference signal and second reference signal are different. For example, the communication component 250 and/or the transceiver 202 of the UE 110 may receive a corresponding RACH message having a second DMRS that is quasi co-located with a second reference signal, wherein the first reference signal and second reference signal are different. As used herein, a DMRS that is "quasi co-located" with a reference signal includes a DMRS having parameters substantially similar to the reference signal. For example, this may include a DMRS having parameters that can be inferred from parameters of another received reference signal, or vice versa. Further, for example, the substantially similar parameters of the DMRS and/or reference signal may include, but are not limited to, Doppler shift, Doppler spread, average delay, delay spread, and/or spatial RX parameters. Additionally, the DMRS and/or reference signal parameters being "substantially similar" may include, but is not limited to, such parameters being within a threshold percentage of one another, e.g., 1%, 2%, 3%, 5%, or 10%. In other words, being "quasi co-located" may refer to such parameters being substantially similar and/or inferable from one to the other. In some implementations, the method 900 may receive a corresponding second message having a second message reference signal that is quasi co-located with a second reference signal, wherein the first reference signal and the second reference signal are different.

At block 906, the method 900 may optionally establish a communication link with a network. For example, the communication component 250 and/or the transceiver 202 of the UE 110 may establish the communication link 120 with the BS 105 after receiving the corresponding RACH message.

In optional implementations, the communication component 250 and/or the transceiver 202 of the UE 110 may receive the reference signal from the BS 105.

In optional implementations, the communication component 250 and/or the transceiver 202 of the UE 110 may receive a mapping of the TCI state of a DMRS of the PDCCH order to the reference signal from the BS 105.

In some implementations, the communication component 250 and/or the transceiver 202 of the UE 110 may optionally receive a RMSI, an OSI, a MAC-CE, a RRC, or a handover report, wherein information relating to the reference signal is included in one or more of the RMSI, OSI, MAC-CE, RRC or the handover report.

In certain implementations, the corresponding RACH message may include one or more of a PDCCH and a PDSCH of MSG 2, a PDCCH of MSG 3 retransmission grant, a PDCCH and a PDSCH of MSG 4.

In some examples, the first reference signal may be transmitted with a first beam and the second reference signal may be transmitted with a second beam. The UE 110 may receive information regarding the second reference signal from the BS 105 of the communication network. Alternatively, the second reference signal may be mapped from the first reference signal. The second reference signal may be a subset of a second group of reference signals, and the first reference signal may be a subset of a first group of reference signals, and network may provide a mapping from the first group to the second group. In some examples, the second reference signal may not depend on the first reference signal.

In non-limiting examples, the PDCCH order may be associated with a first cell in the communication network and the corresponding RACH message may be associated with a second cell in the communication network.

In certain examples, the UE 110 may receive the first reference signal using a first spatial domain transmission filter, and transmit, in response to the PDCCH order, the MSG 1 using a second spatial domain transmission filter, wherein the first spatial domain transmission filter is substantially identical to the second spatial domain transmission filter.

In some implementations, the MSG 1 may be a PRACH preamble associated with the PDCCH order.

In certain examples, the UE 110 may receive the second reference signal using a first spatial domain transmission filter, and transmit, in response to the PDCCH order, a third DMRS of a MSG 3 using a second spatial domain transmission filter, wherein the first spatial domain transmission filter is substantially identical to the second spatial domain transmission filter.

In other examples, the MSG 3 may be a PUSCH that is a scheduled random access response UL grant or a PDCCH whose cyclic redundancy check (CRC) bits are scrambled with the Cell Access Radio Network Temporary Identifier (C-RNTI). The PDCCH and the PDSCH of the MSG 2 may be scheduled with a RA-RNTI. The PDCCH of the MSG 3 may be scheduled with a Temporary Cell Access Radio Network Temporary Identifier (TC-RNTI). The PDCCH and the PDSCH of MSG 4 are scheduled with TC-RNTI or C-RNTI.

In one aspect of the present disclosure, the second DMRS of the corresponding RACH message, such as the RACH MSG 2, may be quasi co-located with the CORESET associated with the type 1 PDCCH common search space set of the primary cell, such as the first cell 105a' as described above. In other words, the second DMRS of the corresponding RACH message may follow the QCL properties (e.g., beam configurations, beam directions, etc.) of the CORESET associated with the type 1 PDCCH common search space set of the primary cell.

Some Further Example Embodiments

Aspects of the present disclosure include methods for receiving a Physical Downlink Control Channel (PDCCH) order for a MSG 1 transmission having a first Demodulation Reference Signal (DMRS) that is quasi co-located with a first reference signal, and receiving a corresponding RACH message having a second DMRS that is quasi co-located with a second reference signal, wherein the first reference signal and second reference signal are different.

Any of the above example methods, wherein the corresponding RACH message includes one or more of a PDCCH and a PDSCH of MSG 2, a PDCCH of MSG 3 retransmission grant, a PDCCH and a PDSCH of MSG 4.

Any of the above example methods, wherein the first reference signal is transmitted with a first beam and the second reference signal is transmitted with a second beam.

Any of the above example methods, further comprising receiving information regarding the second reference signal from a base station of the communication network.

Any of the above example methods, further comprising receiving a Remaining Minimum System Information (RMSI), an Other System Information (OSI), a Media-Access-Control Control Element (MAC-CE), a Radio Resource Control (RRC), or a handover report, wherein information relating to the second reference signal is included in one or more of the RMSI, OSI, MAC-CE, RRC or the handover report.

Any of the above example methods, wherein the PDCCH order is associated with a first cell in the communication network and the corresponding RACH message is associated with a second cell in the communication network.

Any of the above example methods, wherein the second reference signal is mapped from the first reference signal.

Any of the above example methods, wherein the second reference signal is a subset of a second group of reference signals, and the first reference signal is a subset of a first group of reference signals, and network provides a mapping from the first group to the second group.

Any of the above example methods, wherein the second reference signal does not depend on the first reference signal.

Any of the above example methods, further comprising receiving the first reference signal using a first spatial domain transmission filter, and transmitting, in response to the PDCCH order, the MSG 1 using a second spatial domain transmission filter, wherein the first spatial domain transmission filter is substantially identical to the second spatial domain transmission filter.

Any of the above example methods, wherein the MSG 1 is a PRACH preamble associated with the PDCCH order.

Any of the above example methods, further comprising receiving the second reference signal using a first spatial domain transmission filter, and transmitting, in response to the PDCCH order, a third DMRS of a MSG 3 using a second spatial domain transmission filter, wherein the first spatial domain transmission filter is substantially identical to the second spatial domain transmission filter.

Any of the above example methods, wherein the MSG 3 is PUSCH that is a scheduled random access response UL grant or a PDCCH whose cyclic redundancy check (CRC) bits are scrambled with the Cell Access Radio Network Temporary Identifier (C-RNTI).

Any of the above example methods, wherein the PDCCH and the PDSCH of the MSG 2 are scheduled with a Random Access Radio Network Temporary Identifier (RA-RNTI).

Other aspects of the present disclosure include apparatuses including a memory, a transceiver, and one or more processors operatively coupled with the memory and the transceiver, the one or more processors configured to perform the steps of receiving a PDCCH order for a MSG 1 transmission having a first DMRS that is quasi co-located with a first reference signal, and receiving a corresponding RACH message having a second DMRS that is quasi co-located with a second reference signal, wherein the first reference signal and second reference signal are different.

Any of the above example apparatuses, wherein the corresponding RACH message includes one or more of a PDCCH and a PDSCH of MSG 2, a PDCCH of MSG 3 retransmission grant, a PDCCH and a PDSCH of MSG 4.

Any of the above example apparatuses, wherein the first reference signal is transmitted with a first beam and the second reference signal is transmitted with a second beam.

Any of the above example apparatuses, further comprising instructions that, when executed by the one or more processors, cause the one or more processors to receive information regarding the second reference signal from a base station of the communication network.

Any of the above example apparatuses, further comprising instructions that, when executed by the one or more processors, cause the one or more processors to receive a Remaining Minimum System Information (RMSI), an Other System Information (OSI), a Media-Access-Control Control Element (MAC-CE), a Radio Resource Control (RRC), or a handover report, wherein information relating to the second reference signal is included in one or more of the RMSI, OSI, MAC-CE, RRC or the handover report.

Any of the above example apparatuses, wherein the PDCCH order is associated with a first cell in the communication network and the corresponding RACH message is associated with a second cell in the communication network.

Any of the above example apparatuses, wherein the second reference signal is mapped from the first reference signal.

Any of the above example apparatuses, wherein the second reference signal is a subset of a second group of reference signals, and the first reference signal is a subset of a first group of reference signals, and network provides a mapping from the first group to the second group.

Any of the above example apparatuses, wherein the second reference signal does not depend on the first reference signal.

Any of the above example apparatuses, further comprising instructions that, when executed by the one or more processors, cause the one or more processors to receive the first reference signal using a first spatial domain transmission filter, and transmit, in response to the PDCCH order, the MSG 1 using a second spatial domain transmission filter, wherein the first spatial domain transmission filter is substantially identical to the second spatial domain transmission filter.

Any of the above example apparatuses, wherein the MSG 1 is a PRACH preamble associated with the PDCCH order.

Any of the above example apparatuses, further comprising instructions that, when executed by the one or more processors, cause the one or more processors to receive the second reference signal using a first spatial domain transmission filter, and transmit, in response to the PDCCH order, a third DMRS of a MSG 3 using a second spatial domain transmission filter, wherein the first spatial domain transmission filter is substantially identical to the second spatial domain transmission filter.

Any of the above example apparatuses, wherein the MSG 3 is PUSCH that is a scheduled random access response UL grant or a PDCCH whose cyclic redundancy check (CRC) bits are scrambled with the Cell Access Radio Network Temporary Identifier (C-RNTI).

Any of the above example apparatuses, wherein the PDCCH and the PDSCH of the MSG 2 are scheduled with a Random Access Radio Network Temporary Identifier (RA-RNTI).

An aspect of the present disclosure includes an apparatus including means for receiving a PDCCH order for a MSG 1 transmission having a first DMRS that is quasi co-located with a first reference signal, and means receiving a corresponding RACH message having a second DMRS that is quasi co-located with a second reference signal, wherein the first reference signal and second reference signal are different.

Any of the above example methods, wherein the corresponding RACH message includes one or more of a PDCCH and a PDSCH of MSG 2, a PDCCH of MSG 3 retransmission grant, a PDCCH and a PDSCH of MSG 4.

Any of the above example apparatuses, wherein the first reference signal is transmitted with a first beam and the second reference signal is transmitted with a second beam.

Any of the above example apparatuses, further comprising means for receiving information regarding the second reference signal from a base station of the communication network.

Any of the above example apparatuses, further comprising means for receiving a Remaining Minimum System Information (RMSI), an Other System Information (OSI), a Media-Access-Control Control Element (MAC-CE), a Radio Resource Control (RRC), or a handover report, wherein information relating to the second reference signal is included in one or more of the RMSI, OSI, MAC-CE, RRC or the handover report.

Any of the above example apparatuses, wherein the PDCCH order is associated with a first cell in the communication network and the corresponding RACH message is associated with a second cell in the communication network.

Any of the above example apparatuses, wherein the second reference signal is mapped from the first reference signal.

Any of the above example apparatuses, wherein the second reference signal is a subset of a second group of reference signals, and the first reference signal is a subset of a first group of reference signals, and network provides a mapping from the first group to the second group.

Any of the above example apparatuses, wherein the second reference signal does not depend on the first reference signal.

Any of the above example apparatuses, further comprising means for receiving the first reference signal using a first spatial domain transmission filter, and means for transmitting, in response to the PDCCH order, the MSG 1 using a second spatial domain transmission filter, wherein the first spatial domain transmission filter is substantially identical to the second spatial domain transmission filter.

Any of the above example apparatuses, wherein the MSG 1 is a PRACH preamble associated with the PDCCH order.

Any of the above example apparatuses, further comprising means for receiving the second reference signal using a first spatial domain transmission filter, and means for transmitting, in response to the PDCCH order, a third DMRS of a MSG 3 using a second spatial domain transmission filter, wherein the first spatial domain transmission filter is substantially identical to the second spatial domain transmission filter.

Any of the above example apparatuses, wherein the MSG 3 is PUSCH that is a scheduled random access response UL grant or a PDCCH whose cyclic redundancy check (CRC) bits are scrambled with the Cell Access Radio Network Temporary Identifier (C-RNTI).

Any of the above example apparatuses, wherein the PDCCH and the PDSCH of the MSG 2 are scheduled with a Random Access Radio Network Temporary Identifier (RA-RNTI).

Some aspects of the present disclosure include a non-transitory computer readable medium having instructions stored therein that, when executed by one or more processors, cause the one or more processors to perform receiving a PDCCH order for a MSG 1 transmission having a first DMRS that is quasi co-located with a first reference signal, and code receiving a corresponding RACH message having a second DMRS that is quasi co-located with a second reference signal, wherein the first reference signal and second reference signal are different.

Any of the above example non-transitory computer readable medium, wherein the PDCCH order is associated with a first cell in the communication network and the corresponding RACH message is associated with a second cell in the communication network.

Any of the above example non-transitory computer readable medium, wherein the second reference signal is mapped from the first reference signal.

Any of the above example non-transitory computer readable medium, wherein the second reference signal is a subset of a second group of reference signals, and the first reference signal is a subset of a first group of reference signals, and network provides a mapping from the first group to the second group.

Any of the above example non-transitory computer readable medium, wherein the second reference signal does not depend on the first reference signal.

Any of the above example non-transitory computer readable medium, further comprising instructions that, when executed by the one or more processors, cause the one or more processors to receive the first reference signal using a first spatial domain transmission filter, and transmit, in response to the PDCCH order, the MSG 1 using a second spatial domain transmission filter, wherein the first spatial domain transmission filter is substantially identical to the second spatial domain transmission filter.

Any of the above example non-transitory computer readable medium, wherein the MSG 1 is a PRACH preamble associated with the PDCCH order.

Any of the above example non-transitory computer readable medium, further comprising instructions that, when executed by the one or more processors, cause the one or more processors to receive the second reference signal using a first spatial domain transmission filter, and transmit, in response to the PDCCH order, a third DMRS of a MSG 3 using a second spatial domain transmission filter, wherein the first spatial domain transmission filter is substantially identical to the second spatial domain transmission filter.

Any of the above example non-transitory computer readable medium, wherein the MSG 3 is PUSCH that is a scheduled random access response UL grant or a PDCCH whose cyclic redundancy check (CRC) bits are scrambled with the Cell Access Radio Network Temporary Identifier (C-RNTI).

Any of the above example non-transitory computer readable medium, wherein the PDCCH and the PDSCH of the MSG 2 are scheduled with a Random Access Radio Network Temporary Identifier (RA-RNTI).

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
receiving a Physical Downlink Control Channel (PDCCH) order for a MSG 1 transmission having a first Demodulation Reference Signal (DMRS) that is quasi co-located with a first reference signal; and
receiving a corresponding RACH message having a second DMRS that is quasi co-located with a second reference signal of a control resource set (CORESET) associated with a type 1 PDCCH common search space set of a cell associated with the PDCCH order, wherein the first reference signal and second reference signal are different,
wherein the second reference signal is mapped from a transmission configuration indication (TCI) state of the first reference signal.

2. The method of claim 1, wherein the corresponding RACH message includes one or more of a PDCCH and a PDSCH of MSG 2, a PDCCH of MSG 3 retransmission grant, a PDCCH and a PDSCH of MSG 4.

3. The method of claim 1, wherein the first reference signal is transmitted with a first beam and the second reference signal is transmitted with a second beam.

4. The method of claim 3, further comprising receiving information regarding the second reference signal from a base station of a communication network.

5. The method of claim 4, further comprising receiving a Remaining Minimum System Information (RMSI), an Other System Information (OSI), a Media-Access-Control Control Element (MAC-CE), a Radio Resource Control (RRC), or a handover report, wherein information relating to the second reference signal is included in one or more of the RMSI, OSI, MAC-CE, RRC or the handover report.

6. The method of claim 1, wherein:
the PDCCH order is associated with a first cell in a communication network and the corresponding RACH message is associated with a second cell in the communication network.

7. The method of claim 1, wherein the second reference signal is a subset of a second group of reference signals, and the first reference signal is a subset of a first group of reference signals, and network provides a mapping from the first group to the second group.

8. The method of claim 1, wherein the second reference signal does not depend on the first reference signal.

9. The method of claim 1, further comprising:
receiving the first reference signal using a first spatial domain transmission filter; and
transmitting, in response to the PDCCH order, the MSG 1 using a second spatial domain transmission filter, wherein the first spatial domain transmission filter is substantially identical to the second spatial domain transmission filter.

10. The method of claim 9, wherein the MSG 1 is a PRACH preamble associated with the PDCCH order.

11. The method of claim 1, further comprising:
receiving the second reference signal using a first spatial domain transmission filter; and
transmitting, in response to the PDCCH order, a third DMRS of a MSG 3 using a second spatial domain transmission filter, wherein the first spatial domain transmission filter is substantially identical to the second spatial domain transmission filter.

12. The method of claim 11, wherein the MSG 3 is PUSCH that is a scheduled random access response UL grant or a PDCCH whose cyclic redundancy check (CRC) bits are scrambled with a Cell Access Radio Network Temporary Identifier (C-RNTI).

13. The method of claim 2, wherein the PDCCH and the PDSCH of the MSG 2 are scheduled with a Random Access Radio Network Temporary Identifier (RA-RNTI), or the PDCCH of the MSG 3 is scheduled with a Temporary Cell Access Radio Network Temporary Identifier (TC-RNTI), or the PDCCH and the PDSCH of MSG 4 are scheduled with TC-RNTI or C-RNTI.

14. A user equipment (UE), comprising:
one or more processors;
a transceiver; and
a memory in communication with the transceiver and the one or more processors, the memory includes instructions that, when executed by the one or more processors, cause the one or more processors to:
receive a Physical Downlink Control Channel (PDCCH) order for a MSG 1 transmission having a first Demodulation Reference Signal (DMRS) that is quasi co-located with a first reference signal; and
receive a corresponding RACH message having a second DMRS that is quasi co-located with a second reference signal of a control resource set (CORESET) associated with a type 1 PDCCH common search space set of a cell associated with the PDCCH order, wherein the first reference signal and second reference signal are different,
wherein the second reference signal is mapped from a transmission configuration indication (TCI) state of the first reference signal.

15. The UE of claim 14, wherein the corresponding RACH message includes one or more of a PDCCH and a PDSCH of MSG 2, a PDCCH of MSG 3 retransmission grant, a PDCCH and a PDSCH of MSG 4.

16. The UE of claim 14, wherein the first reference signal is transmitted with a first beam and the second reference signal is transmitted with a second beam.

17. The UE of claim 16, further comprises instructions that, when executed by the one or more processors, cause the one or more processors to receive information regarding the second reference signal from a base station of a communication network.

18. The UE of claim 17, further comprises instructions that, when executed by the one or more processors, cause the one or more processors to receive a Remaining Minimum System Information (RMSI), an Other System Information (OSI), a Media-Access-Control Control Element (MAC-CE), a Radio Resource Control (RRC), or a handover report, wherein information relating to the second reference signal is included in one or more of the RMSI, OSI, MAC-CE, RRC or the handover report.

19. The UE of claim 14, wherein:
the PDCCH order is associated with a first cell in a communication network and the corresponding RACH message is associated with a second cell in the communication network.

20. The UE of claim 14, wherein the second reference signal is a subset of a second group of reference signals, and the first reference signal is a subset of a first group of reference signals, and network provides a mapping from the first group to the second group.

21. The UE of claim 14, wherein the second reference signal does not depend on the first reference signal.

22. The UE of claim 14, further comprises instructions that, when executed by the one or more processors, cause the one or more processors to:
receive the first reference signal using a first spatial domain transmission filter; and
transmit, in response to the PDCCH order, the MSG 1 using a second spatial domain transmission filter, wherein the first spatial domain transmission filter is substantially identical to the second spatial domain transmission filter.

23. The UE of claim 22, wherein the MSG 1 is a PRACH preamble associated with the PDCCH order.

24. The UE of claim 14, further comprises instructions that, when executed by the one or more processors, cause the one or more processors to:
receive the second reference signal using a first spatial domain transmission filter; and
transmit, in response to the PDCCH order, a third DMRS of a MSG 3 using a second spatial domain transmission filter, wherein the first spatial domain transmission filter is substantially identical to the second spatial domain transmission filter.

25. The UE of claim 24, wherein the MSG 3 is PUSCH that is a scheduled random access response UL grant or a PDCCH whose cyclic redundancy check (CRC) bits are scrambled with a Cell Access Radio Network Temporary Identifier (C-RNTI).

26. The UE of claim 15, wherein the PDCCH and the PDSCH of the MSG 2 are scheduled with a Random Access Radio Network Temporary Identifier (RA-RNTI), or the PDCCH of the MSG 3 is scheduled with a Temporary Cell Access Radio Network Temporary Identifier (TC-RNTI), or the PDCCH and the PDSCH of MSG 4 are scheduled with TC-RNTI or C-RNTI.

27. A non-transitory computer-readable medium having instructions stored therein that, when executed by one or more processors, cause the one or more processors to:
receive a Physical Downlink Control Channel (PDCCH) order for a MSG 1 transmission having a first Demodulation Reference Signal (DMRS) that is quasi co-located with a first reference signal; and
receive a corresponding RACH message having a second DMRS that is quasi co-located with a second reference signal of a control resource set (CORESET) associated with a type 1 PDCCH common search space set of a cell associated with the PDCCH order, wherein the first reference signal and second reference signal are different,
wherein the second reference signal is mapped from a transmission configuration indication (TCI) state of the first reference signal.

28. An apparatus for wireless communications, comprising:
means for receiving a Physical Downlink Control Channel (PDCCH) order for a MSG 1 transmission having a first Demodulation Reference Signal (DMRS) that is quasi co-located with a first reference signal; and
means for receiving a corresponding RACH message having a second DMRS that is quasi co-located with a second reference signal of a control resource set (CORESET) associated with a type 1 PDCCH common search space set of a cell associated with the PDCCH order, wherein the first reference signal and second reference signal are different,
wherein the second reference signal is mapped from a transmission configuration indication (TCI) state of the first reference signal.

29. The method of claim 6, wherein the first cell is a Secondary serving cell (SCell) and the second cell is a special cell (sPCell).

* * * * *